3,281,445
STABILIZATION OF ORGANIC ISOCYANATES WITH SULFOXIDES, SULFONES AND SULFITE ESTERS
David T. Manning, South Charleston, and Bertrand D. Ash, St. Albans, W. Va., assignors to Union Carbide Corporation, a corporation of New York
No Drawing. Filed May 9, 1963, Ser. No. 279,325
7 Claims. (Cl. 260—453)

This invention relates to isocyanate compositions, particularly an isocyanate composition stabilized from discoloration.

Isocyanates are typically colorless liquids or solids which are found to discolor on storage. Discoloration of isocyanates deleteriously affects their saleability typically because the color may be transferred to the product in which the isocyanate is employed. This is particularly so in the case of polyisocyanates used in resin manufacture.

It is herein described an agent which significantly retards discoloration of the isocyanate product thus allowing storage of the isocyanate for reasonable periods of time prior to use. These agents are particularly effective when employed in solution with the isocyanate.

The agents employed in this invention for retarding discoloration of organic isocyanates are organic and possess at least one oxygen atom bonded to a sulfur atom therein by a semi-polar double ("dative" or "coordinate") bond, often represented as an ordinary double bond. Such a bond arrangement is typically characterized by the oxysulfur bond formulae:

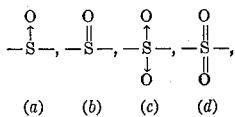

(a)  (b)  (c)  (d)

Because of the art recognized indefiniteness of the type of bond arrangement between oxygen and sulfur, (b) and (d) are considered equivalent to (a) and (c), respectively, and throughout the description herein, all of the possible bond arrangements between oxygen and sulfur where the total free valences of oxygen are involved in the bond are considered semi-polar bonds, i.e., $S \rightarrow O$. The remaining free valences of the sulfur atom may be covalently bonded to carbon and/or oxygen of an organic radical. Illustrative of such compounds are sulfoxides, sulfones, sulfite esters, polysulfones, polysulfoxides, sulfonate esters, sulfate esters, and the like. Particularly desirable oxysulfur-bearing compounds include sulfoxides, sulfones, and sulfite esters.

One significant class of oxysulfur-bearing compounds contemplated for use in this invention includes sulfoxides of the formula:

I
$$R-\overset{O}{\underset{\uparrow}{S}}-R'$$

wherein R and R' can be alkyl, particularly of from 1 to 12 carbon atoms, such as methyl, ethyl, n-propyl, n-butyl, n-heptyl, 2-ethylhexyl, n-octyl, 2,2,4-trimethylpentyl, n-nonyl, n-decyl, and the like; cycloalkyl, particularly of from 5 to 8 carbon atoms in the ring, such as cyclopentyl, cyclohexyl, cycloheptyl, cyclooctyl, and the like; aralkyl, particularly those having the formula AR—$(CH_2)_n$—, wherein $n$ is an integer of from 1 to 6 and AR is aryl such as phenyl, alpha-naphthyl, beta-naphthyl, and the like, which aralkyl formula is illustrated by such radicals as benzyl, alpha-naphthylmethyl, beta-naphthylmethyl, 2-phenylethyl, 4-phenylbutyl, 6-alpha-naphthylhexyl, and the like; haloalkyl, particularly those having the formula X—$(CH_2)_a$—, wherein $a$ is an integer of from about 2 to 8 and X is halogen, such as F, Cl, and Br, which haloalkyl formula is illustrated by such radicals as 3-chloropropyl, 4-bromobutyl, 6-chlorohexyl, 8-fluorooctyl, and the like; acyloxyalkyl or aroyloxyalkyl radicals such as those having the formula:

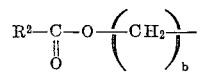

wherein $b$ is an integer of from about 2 to 6 and $R^2$ can be alkyl, aryl, aralkyl, cycloalkyl, haloalkyl, and the like, which radical formula is illustrated by such radicals as 2-acetoxyethyl, 2-i-butyroxyethyl, 2-benzoyloxyethyl, 2-propionoxypropyl, 4-cyclohexylcarbonyloxybutyl, 6-acetoxyhexyl, and the like; alkoxycarbonylalkyl, such as those having the formula:

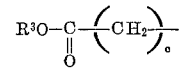

wherein $c$ is an integer of from about 2 to 6, and $R^3$ is a radical such as alkyl, aryl, aralkyl, cycloalkyl, haloalkyl, and the like, which alkoxycarbonylalkyl formula is illustrated by such radicals as 2-methoxycarbonylethyl, 3-benzyloxycarbonylpropyl, 4-cyclohexyloxycarbonylbutyl, 6-(3-chloropropoxycarbonyl)hexyl, and the like; acylalkyl and aroylalkyl, such as those possessing the formula:

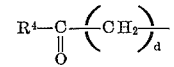

wherein $d$ is an integer of from about 2 to 8 and $R^4$ can be alkyl, cycloalkyl, aryl, aralkyl, haloalkyl and the like, which radical formula is illustrated by such groups as 2-acetylethyl, 4-cyclohexanecarbonylbutyl, 6-i-butyrylhexyl, 8-(3-chloropropionyl)octyl; and the like.

Specific sulfoxides encompassed by Formula I include dimethyl sulfoxide, ethyl methyl sulfoxide, propyl butyl sulfoxide, ethyl heptyl sulfoxide, i-propyl nonyl sulfoxide, ethyl 2,2,4-trimethylpentylsulfoxide, dicyclopentyl sulfoxide, dicyclohexyl sulfoxide, dicycloheptyl sulfoxide, dicyclooctyl sulfoxide, cyclohexyl methyl sulfoxide, cyclopentyl ethyl sulfoxide, cycloheptyl propyl sulfoxide, dibenzyl sulfoxide, benzyl ethyl sulfoxide, 3-(alpha-naphthyl)propyl benzyl sulfoxide, di-6-(beta-naphthyl)hexyl sulfoxide, 3-phenylpropyl 5-(alpha-naphthyl)pentyl sulfoxide, 3-chloropropyl 4-bromobutyl sulfoxide, 3-chloropropyl methyl sulfoxide, di(6-chlorohexyl) sulfoxide, 3-chloropropyl 8-fluorooctyl sulfoxide, di(2-acetoxyethyl) sulfoxide, 2-i-butyroxyethyl methyl sulfoxide, 2-benzoyloxyethyl 4-cyclohexylcarbonyloxybutyl sulfoxide, 6-acetoxyhexyl 3-propionoxypropyl sulfoxide, di(2-methoxycarbonylethyl) sulfoxide, di(2-ethoxycarbonylethyl) sulfoxide, 3-benzyloxycarbonylpropyl ethyl sulfoxide, 4-cyclohexyloxycarbonylbutyl 6-(3-chloropropoxycarbonyl)hexyl sulfoxide, di(2-acetylethyl) sulfoxide, 2-acetylethyl 4-cyclohexanecarbonylbutyl sulfoxide, 6-i-butyrylhexyl propyl sulfoxide, and 2-acetylethyl 8-(3-chloropropionyl)octyl sulfoxide.

In addition to the aforementioned sulfoxides, another desirable class of oxysulfur-bearing compounds contemplated for use in this invention include saturated cyclic sulfones of the formula:

(II)
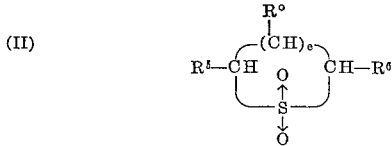

wherein $e$ is an integer of from about 2 to 5 and $R^\circ$, $R^5$ and $R^6$ can be hydrogen, alkyl, haloalkyl, aralkyl, alkoxycarbonylalkyl, aralkoxycarbonylalkyl, hydroxy, alkenylcarbonyloxy, acyloxy, aroyloxyl, acyl, aroyl, and the like radicals.

Examples of $R^5$ and $R^6$ radicals includes hydroxy; alkyl, desirably containing from 1 to 12 carbon atoms, such as methyl, ethyl, propyl, i-propyl, hexyl, octyl, 3-methylbutyl, decyl and the like; haloalkyl, such as characterized by the formula:

wherein $f$ is an integer of from about 1 to 8, and X may be F, Cl and Br; aralkyl, particularly those containing from 7 to 16 carbon atoms, such as benzyl, alpha-naphthylmethyl, beta-naphthylmethyl, 3-phenylpropyl, 6-(alpha-naphthyl)hexyl, and the like; alkoxylcarbonylalkyl and aralkoxycarbonylalkyl, such as are characterized by the formula:

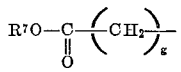

wherein $g$ is an integer of from about 2 to 7 and $R^7$ may be alkyl, cycloalkyl, haloalkyl, aryl, aralkyl, and the like, which formula is illustrated by the radicals: 2-methoxycarbonylethyl, 4-cyclohexyloxycarbonylbutyl, 7-ethoxycarbonylheptyl, 3-phenoxycarbonylpropyl, and the like; alkenylcarbonyloxy, such as is characterized by the formula:

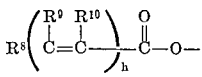

wherein $h$ is the integers 1 or 2, $R^8$ can be aryl, methyl, ethyl, or hydrogen, $R^9$ can be hydrogen, or lower alkyl (1 to 4 carbon atoms) and $R^{10}$ can be hydrogen or lower alkyl (1 to 4 carbon atoms) which formula is characterized by the radicals: acryloxy, methacryloxy, crotyloxy, sorbyloxy, and the like; acyloxy and aroyloxy, such as acetoxy, butyroxy, phenylacetoxy, benzoyloxy, and the like; and acyl and/or aroyl, such as acetyl, propionyl, i-butyryl, benzoyl, and the like.

Specific sulfones encompassed by Formula II include tetrahydrothiophene-1,1-dioxide, hexamethylene sulfone, heptamethylene sulfone, 3 - methyltetrahydrothiophene-1,1-dioxide, 3-hexyltetrahydrothiophene-1,1-dioxide, 3-i-propyltetrahydrothiophene-1,1-dioxide, 2 - ethylhexamethylene sulfone, 3-propylheptamethylene sulfone, 3,4-dimethyltetrahydrothiophene - 1,1 - dioxide, 2-propyl-4-(3-methylbutyl)hexamethylene sulfone, 2-methyl-6-decylheptamethylene sulfone, 2,3-dibutylhexamethylene sulfone, 2-(3-chloropropyl)tetrahydrothiophene-1,1-dioxide, 2,5-di-(2-chloroethyl)hexamethylene sulfone, 3-chloromethyl-5-propylheptamethylene sulfone, 4-(7 - fluoroheptyl)hexamethylene sulfone, 3-(2-chloroethyl)tetrahydrothiophene-1,1-dioxide, 9-bromononylheptamethylene sulfone, 3,4-dibenzyltetrahydrothiophene-1,1-dioxide, 4-alpha-naphthylmethylhexamethylene sulfone, 2-methyl-3-(phenylpropyl) heptamethylene sulfone, 3-beta-naphthylmethyltetrahydrothiophene-1,1-dioxide, 2-ethyl-5-(6-alpha-naphthyl)hexyl-hexamethylene sulfone, 3-(2-methoxycarbonylethyl)tetrahydrothiophene-1,1-dioxide, 3-cyclohexyl oxycarbonylbutyl-5-methylhexamethylene sulfone, 2,7-di(7-ethoxycarbonylheptyl)heptamethylene sulfone, 4 - hydroxyhexamethylene sulfone, 3-hydroxytetrahydrothiophene-1,1-dioxide, 3-acryloxytetrahydrothiophene-1,1dioxide, 3-methacryloxytetrahydrothiophene-1,1-dioxide, 3 - crotyloxytetrahydrothiophene-1,1-dioxide, 3-sorbyloxytetrahydrothiophene-1,1-dioxide, 4 - crotyloxyhexamethylene sulfone, 2-methyl-5-methacryloxyheptamethylene sulfone, 3-acetoxytetrahydrothiophene-1,1-dioxide, 4-benzoyloxyhexamethylene sulfone, 2,5-dibutyroxyheptamethylene sulfone, 3-ethyl-4-phenylacetoxytetrahydrothiophene-1,1 - dioxide, 3-acetyltetrahydrothiophene-1,1-dioxide, 3 - benzoyltetrahydrothiophene-1,1-dioxide, 4-propionylhexamethylene sulfone, 3-i-butyrylheptamethylene sulfone, and the like.

Other oxysulfur agents, in addition to the above, include sulfites of the formula:

III 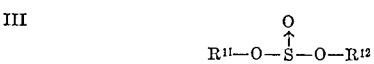

wherein $R^{11}$ and $R^{12}$ may be alkyl, particularly alkyl of 1 to 8 carbon atoms, such as methyl, ethyl, isopropyl, hexyl, octyl, 2-ethylhexyl, and the like; aralkyl, such as 3-phenylpropyl, 4-alpha-naphthylbutyl, 7-beta-naphthylheptyl, and the like; haloalkyl, such as 4-chlorobutyl, 6-chlorohexyl, 8-bromoöctyl, and the like.

Typical compounds characterized by Formula III include dimethyl sulfite, diethyl sulfite, dihexyl sulfite, dioctyl sulfite, methyl propyl sulfite, butyl octyl sulfite, di-(3-phenylpropyl) sulfite, (di-4-alpha-naphthyl) sulfite, di-(7-beta-naphthylheptyl) sulfite, di(4-chlorobutyl) sulfiite, di(6-chlorohexyl) sulfite, di(8-bromoöctyl) sulfite, and the like.

The isocyanates which may be treated to retard discoloration are organic mono- and polyisocyanates, such as aliphatic, cycloaliphatic and aromatic mono-, di-, tri- and/or other polyisocyanates which tend to discolor under conditions of moisture and temperature typically associated with industrial storage procedures. Illustrative of organic isocyanates which are beneficially stabilized from discoloration include the following: tolylene-2,4 and 2,6 - diisocyanate, 4,4′-methylenedi - o - tolylisocyanate, 2,4,4′-triisocyanatodiphenylether, toluene-2,4,6-triisocyanate, 1-methoxy-2,4,6-benzenetriisocyanate, m-phenylenediisocyanate, 4-chloro-m-phenylenediisocyanate, 4,4′-biphenyldiisocyanate, 1,5-naphthalenediisocyanate, 1,4-tetramethylenediisocyanate, 1,6-hexamethylene diisocyanate, 1,10-decamethylenediisocyanate, 1,4-cyclohexanediisocyanate, 1,2-ethylene diisocyanate, 4,4′-methylenediphenylisocyanate, bis(4-isocyanatocyclohexyl)methane, stilbene diisocyanates, dixylylmethane diisocyanates, 2,2-bis(p-isocyanatophenyl) propane, diphenylmethane tetraisocyanates, trimethylbenzene triisocyanates, phenyltolylmethane triisocyanates, ditolylmethane triisocyanates, triphenylmethane triisocyanates, 3,3′-dimethyldiphenylene-4,4′-diisocyanate, 3,3′-dimethoxydiphenylene - 4,4′-diisocyanate, diphenyl triisocyanates and isomers of bis(p,p′-isocyanatophenyl)cyclohexane.

The particular color retardation agent selected (color stabilizing agents) should be capable of dissolution in the particular isocyanate to be stabilized regardless of whether the isocyanate is a liquid at ambient temperature or must be warmed to transform it to the liquid state. The selected agent should be stable at the temperature of the isocyanate at the time of incorporation, and incorporation should be effected at a temperature below that of decomposition or of any undesirable reaction of the isocyanate with itself or the agent. The agent, or mixtures of the agents, should be employed in the isocyanate in any amount sufficient to retard discoloration. Usually that amount falls between 0.005 and 5 percent by weight of the isocyanate. Preferably, the agent is employed in amounts from about 0.01 to 1.0 percent by weight of isocyanate. In general, this invention is directed to employing an amount of the agent sufficient to retard discoloration of the isocyanate.

The following serves to specifically illustrate operation of this invention, however, it is not intended to limit the scope of this invention.

*Example I*

A dry 8-ounce glass bottle is purged with dry nitrogen and charged with a mixture of 130 grams of colorless, pure, freshly-distilled tolylene diisocyanate (80 weight percent 2,4-tolylene diisocyanate and 20 weight percent 2,6-tolylene diisocyanate) and 0.13 gram of diethyl sulfite. The resulting composition is blanketed under dry nitrogen and the bottle securely sealed by wrapping its stopper with tape. A similar sample is prepared, but without the added diethyl sulfite, for use as a blank.

Both the blank and the diethyl sulfite test samples are stored in the dark at room temperature, about 25° C.

Examination after storage for four days reveals the development of a definite yellow color in the blank while the sample containing diethyl sulfite is found to be colorless. After fourteen days, the diethyl sulfite-containing sample exhibits significantly less coloring than the blank sample.

*Example II*

The procedure of Example I is repeated except that 0.13 gram of tetrahydrothiophene-1,1-dioxide is substituted for the diethyl sulfite. The tetrahydrothiophene-1,1-dioxide-containing sample exhibits significantly less yellowing than the blank sample after a forty-day storage period.

*Example III*

The procedure of Example I is repeated except that 0.13 gram of dimethyl sulfoxide is substituted for the diethyl sulfite. The dimethyl sulfoxide-containing sample exhibits significantly less yellowing than the blank sample after a fourteen-day storage period.

*Example IV*

The procedure of Example I is repeated except that 0.13 gram of 3-acryloxytetrahydrothiophene-1,1-dioxide is substituted for the diethyl sulfite. The 3-acryloxytetrahydrothiophene-1,1-dioxide-containing sample exhibits significantly less yellowing than the blank sample after a thirty-day storage period.

*Example V*

The procedure of Example I is repeated except that 0.13 gram of 3-methacryloxytetrahydrothiophene-1,1-dioxide is substituted for the diethyl sulfite. The 3-methacryloxytetrahydrothiophene-1,1-dioxide - containing sample exhibits significantly less yellowing than the blank sample after a thirty-day storage period.

*Example VI*

The procedure of Example I is repeated except that 0.13 gram of 3-hydroxytetrahydrothiophene-1,1-dioxide is substituted for the diethyl sulfite. The 3-hydroxytetrahydrothiophene-1,1-dioxide-containing sample exhibits significantly less yellowing than the blank sample after a forty-day storage period.

*Example VII*

The procedure of Example I is repeated except that 0.13 gram of 3-benzoyloxytetrahydrothiophene-1,1-dioxide is substituted for the diethyl sulfite. The 3-benzoyloxytetrahydrothiophene-1,1-dioxide-containing sample exhibits significantly less yellowing than the blank sample after a nineteen-day storage period.

Though the above relates to specifics of the present invention, this invention is not intended to be restricted thereby except insofar as these specifics appear in the claims.

What is claimed is:

1. A solution of tolylene diisocyanate and a sufficient amount of diethyl sulfite to retard discoloration of said diisocyanate.

2. A solution of tolylene diisocyanate and a sufficient amount of dimethyl sulfite to retard discoloration of said diisocyanate.

3. A solution of tolylene diisocyanate and a sufficient amount of 3-acryloxytetrahydrothiophene-1,1-dioxide to retard discoloration of said diisocyanate.

4. A solution of tolylene diisocyanate and a sufficient amount of 3-methacryloxytetrahydrothiophene-1,1-dioxide to retard discoloration of said diisocyanate.

5. A solution of tolylene diisocyanate and a sufficient amount of 3-hydroxytetrahydrothiophene-1,1-dioxide to retard discoloration of said diisocyanate.

6. A solution of tolylene diisocyanate and a sufficient amount of 3-benzoyloxytetrahydrothiophene-1,1-dioxide to retard discoloration of said diisocyanate.

7. A solution of tolylene diisocyanate and a sufficient amount of tetrahydrothiophene-1,1-dioxide to retard discoloration of said diisocyanate.

References Cited by the Examiner
UNITED STATES PATENTS

| | | | |
|---|---|---|---|
| 2,130,322 | 9/1938 | Kharasch | 260—578 |
| 2,472,868 | 6/1949 | Tillitson | 260—578 |
| 2,885,420 | 5/1959 | Spiegler | 260—453 |
| 2,956,896 | 10/1960 | Kibler et al. | 252—300 |

CHARLES B. PARKER, *Primary Examiner.*

IRVING MARCUS, JOSEPH P. BRUST, *Examiners.*

DALE R. MAHANAND, *Assistant Examiner.*